United States Patent
Wontner et al.

[11] Patent Number: 6,001,038
[45] Date of Patent: Dec. 14, 1999

[54] METHOD OF CONTROLLING A POWER DISTRIBUTION HYDROMECHANICAL BRANCHED TRANSMISSION IN UNCERTAIN GEAR POSITIONS

[75] Inventors: Gebhard Wontner, Wolfern; Josef Leitner, Kollerschlag, both of Austria

[73] Assignee: Steyr-Daimler-Puch Aktiengesellschaft, Vienna, Austria

[21] Appl. No.: 09/091,871

[22] PCT Filed: Nov. 15, 1996

[86] PCT No.: PCT/AT96/00227

§ 371 Date: Jun. 25, 1998

§ 102(e) Date: Jun. 25, 1998

[87] PCT Pub. No.: WO97/24539

PCT Pub. Date: Jul. 10, 1997

[30] Foreign Application Priority Data

Dec. 27, 1995 [DE] Germany .......................... 195 48 934

[51] Int. Cl.⁶ .................................................. F16H 47/04
[52] U.S. Cl. .................................. 475/81; 475/72; 475/80
[58] Field of Search .................................. 475/72, 76, 78, 475/79, 80, 81

[56] References Cited

U.S. PATENT DOCUMENTS

| | | | |
|---|---|---|---|
| 4,168,637 | 9/1979 | Orshanshy, Jr. et al. | 475/81 |
| 4,261,226 | 4/1981 | Orshanshy, Jr. et al. | 475/81 |
| 4,363,247 | 12/1982 | Weseloh | 475/82 |
| 5,267,911 | 12/1993 | Meyerle | 475/81 |
| 5,683,322 | 11/1997 | Meyerle | 475/72 |

FOREIGN PATENT DOCUMENTS

| | | |
|---|---|---|
| 44 17 335 | 3/1995 | Germany . |
| 195 10 179 | 9/1995 | Germany . |
| 195 27 754 | 3/1996 | Germany . |
| 90/05864 | 5/1990 | WIPO . |

*Primary Examiner*—Charles A Marmor
*Assistant Examiner*—Scott Lund
*Attorney, Agent, or Firm*—Bachman & LaPointe, P.C.

[57] ABSTRACT

Described is a method of controlling a power distribution hydromechanical branched transmission consisting of an adjustable hydrostatic unit (4), an integrating planetary gear (10) with at least two outputs (26, 27) and, connected to the integrating planetary gear, a range-changing gear (11) designed as a double planetary gear. The two outputs (26, 27) are connected to the range-changing gear (11) by a first clutch (K1) or a second clutch (K2), and one element of the range-changing gear (11) is controlled by a third clutch (KV). Additional clutches (K3, K4) are fitted for the other ranges. In conditions in which the gear-change position is uncertain, the first clutch (K1) or the second clutch (K2), depending on the instantaneous speed of the vehicle, is synchronized and engaged by adjusting the hydrostatic unit (4), and then either one of the other clutches (K3, K4) or the third clutch (KV) is synchronized and engaged.

3 Claims, 4 Drawing Sheets

| MOTION GEAR \ CLUTCH | KV | KR | K1 | K2 | K3 | K4 |
|---|---|---|---|---|---|---|
| R2 |  | X |  | X |  |  |
| R1 |  | X | X |  |  |  |
| V1 | X |  | X |  |  |  |
| V2 | X |  |  | X |  |  |
| V3 |  |  |  | X | X |  |
| V4 |  |  |  | X |  | X |

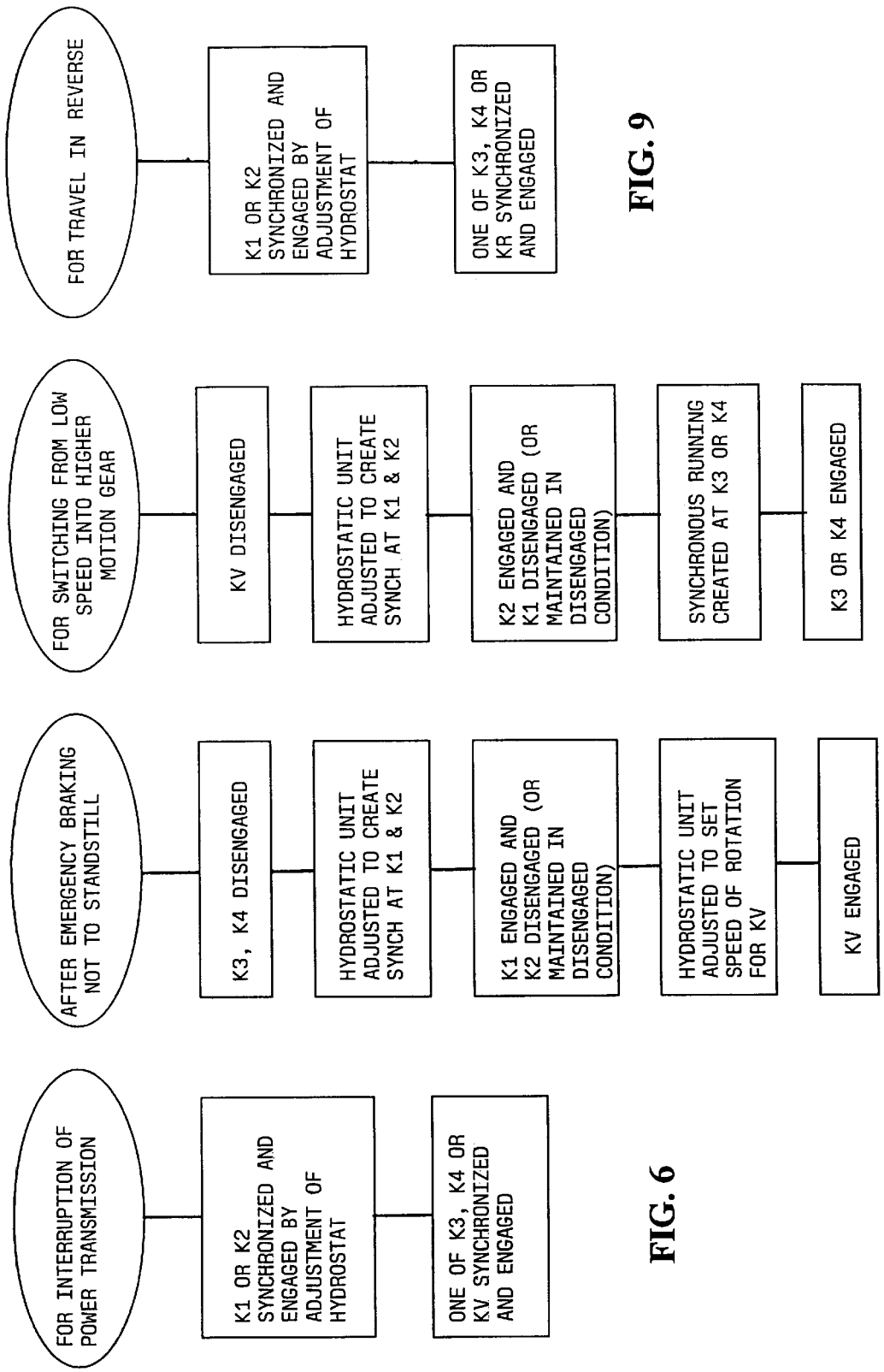

METHOD OF CONTROLLING A POWER DISTRIBUTION HYDROMECHANICAL BRANCHED TRANSMISSION IN UNCERTAIN GEAR POSITIONS

BACKGROUND OF THE INVENTION

The invention relates to methods for controlling a power-dividing transmission, which comprises an adjustable hydrostat unit, a summating planet transmission with at least two outputs, and a downstream motion gear transmission designed as a dual planet transmission, and in which n stages follow one another at synchronous points at which clutches are connected, in which the at least two outputs are connectable to the motion gear transmission via a first clutch or a second clutch and an element of the motion gear transmission is adjustable via a third clutch, and further clutches for further motion gears are provided at the off-take side of the motion gear transmission.

In such transmissions (in the form in which they are known, for example, from EP 386 214 B) the control ensures that in the event of a change in the speed a motion gear change is undertaken in each case at the correct moment. If the change in speed takes place so rapidly that the control is unable to follow (for example in the case of emergency braking), the clutch of the just selected motion gear must be disengaged, in order to prevent the engine from stalling. If the emergency braking is continued until the vehicle is at a standstill, the transmission is brought into the normal position, and the vehicle is able to start off in the first motion gear.

If the emergency braking is not continued until the vehicle is at a standstill then, in the higher motion gears, synchronization of the disengaged clutch is possible by adjustment of the hydrostat. However, in most cases emergency braking is performed almost to standstill. In these circumstances, synchronization is no longer possible, since all clutches must be disengaged. The transmission is situated in an undefined switching position, in which initial synchronization of the first clutch (K1) to be engaged for the lowest gear is not possible. Thus, it is necessary to brake to complete standstill in order to be able to accelerate again. Another undefined switching position is present if, when the gear selector lever is in the neutral position, the vehicle starts to move for example on a slope. In these circumstances as well, according to the prior art it is not possible to engage a motion gear.

Accordingly, the object of the invention is to specify a method of control which in all circumstances ensures the engagement of a motion gear suitable for the instantaneous speed of travel without prior standstill, if an interruption of the power transmission has preceded.

SUMMARY OF THE INVENTION

According to the invention the above object is achieved in that, irrespective of the position of the third clutch and of the further clutches, depending upon the instantaneous speed of travel, the first clutch or the second clutch is synchronized and engaged by adjustment of the hydrostat and either one of the further clutches or the third clutch is synchronized and then engaged.

In the event of an emergency braking which is not performed to complete standstill, the method consists of the steps recited in claim 1; if the vehicle rolls while the transmission is in the neutral position, the method consists of the steps recited in claim 2. In the case of transmissions equipped with a clutch for travel in reverse, the method is analogous, that is to say the same, but if instead of the third clutch, the fourth clutch, that is the one for travel in reverse, is actuated in the same way.

BRIEF DESCRIPTION OF THE DRAWINGS

In the text which follows, the invention is described and explained with reference to illustrations.

FIGS. 6–9 are flow diagrams showing the different operations for interruption of power transmission, after emergency braking not to standstill, for switching from low speed to higher motion gear, and for travel in reverse, respectively, in accordance with the method of the present invention.

DETAILED DESCRIPTION

Figure 1:
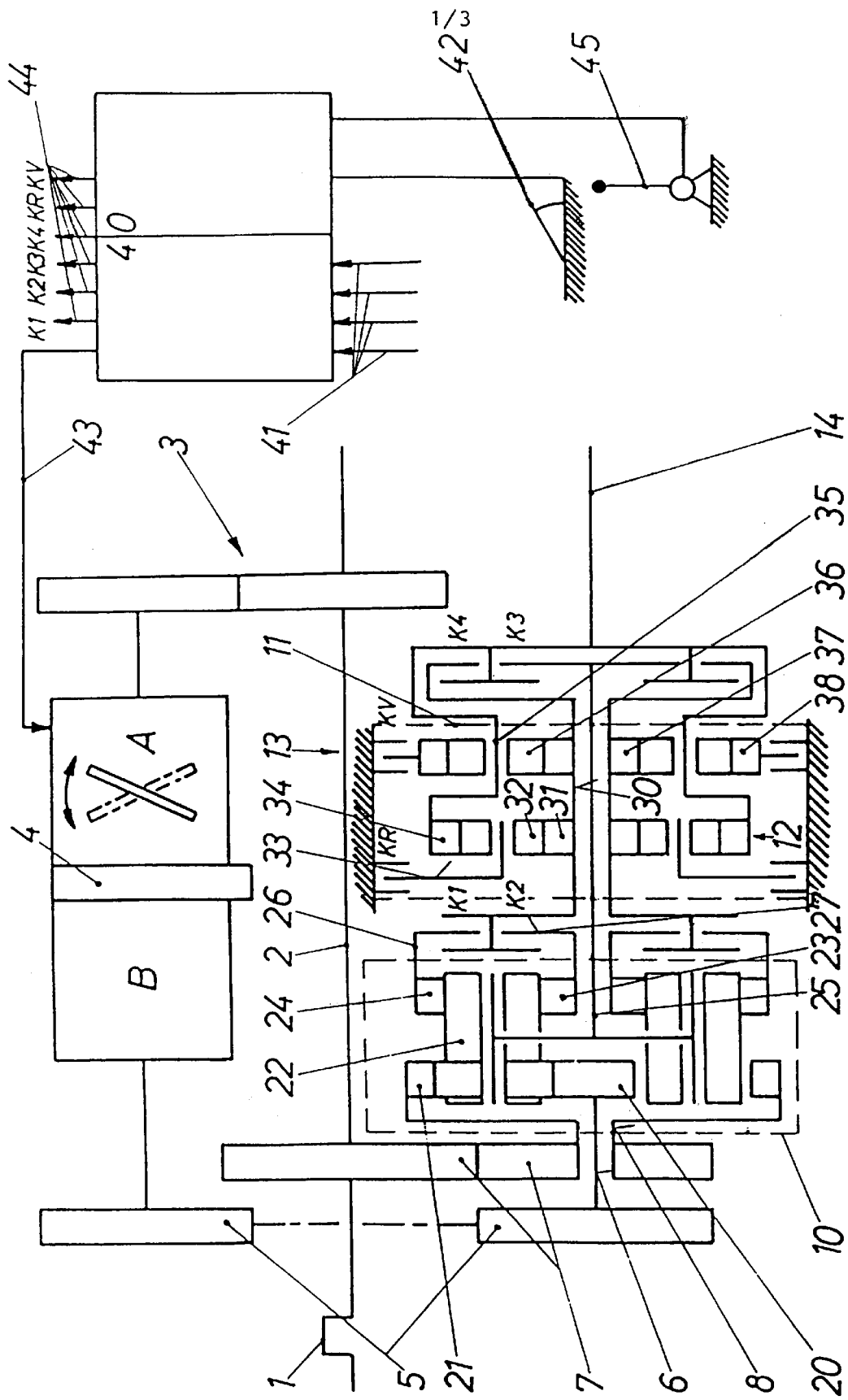
FIG. 1 shows a diagram of a transmission which is suitable for carrying out the method according to the invention.

In FIG. 1, the engine 1, for example an internal combustion engine, is only outlined. Without the interposed clutch, it drives a transmission input shaft 2. The latter drives on the one hand, via a first spur wheel transmission 3, a controllable hydrostat unit 4, the output of which drives a first input shaft 6 via a second spur wheel transmission 5. On the other hand, the transmission input shaft 2 drives a second input shaft 8 via a third spur wheel transmission 7. The hydrostat unit 4 consists of two hydrostatic machines A, B, one of which operates as motor and one as pump at all times. The machine A is infinitely controllable in both directions of rotation.

The two input shafts 6, 8 are part of a summating planet transmission 10, proceeding from which, via a first (K1) and a second (K2) clutch K1, K2, a motion gear 11 is driven, which in this case consists of a first planet transmission stage 12 with a fourth clutch KR and a second planet transmission stage 13 with a third clutch KV. An offtake shaft 14 is connected via further clutches K3, K4, which offtake shaft serves for example to drive a vehicle.

The summating planet transmission 10 includes a first sun 20, a first annular gear 21 and graded planets 22, which form the first planet set. The second planet set consists of a second sun 23, an annular gear 24 and the graded planets 22, which are common to both sets. The planets 22 are mounted on a planet carrier, the shaft 25 of which represents the first output shaft of the summating planet transmission 10. Via an annular gear shaft 26, the second annular gear 24 acts on the first clutch K1 and represents the second output shaft. Via a sun shaft 27, the second sun 23 acts on the second clutch K2 and represents the third output shaft of the summating planet transmission 10.

The first stage 12 of the motion gear transmission 11 consists of a first sun wheel 31, first planet wheels 32, a first planet carrier 33 and a first ring gear 34. The sun wheel shaft 30 is selectively driven by one of the two clutches K1, K2, and the first planet carrier 33 can be fixedly braked on the stationary housing by means of the clutch KR. The first ring gear 34 is connected in rotationally fast fashion to a second planet carrier 35 of the second planet transmission stage 13. Its planet wheels 36 mate internally with a second sun wheel 37, which is connected in rotationally fast fashion to the sun wheel shaft 30, and externally with a second ring gear 38, which can be fixedly braked on the housing by the third clutch KV. The offtake shaft 14 is connected in rotationally fast fashion to the second planet carrier 35 and is connectable, via the further clutches K3, K4 either with the planet carrier shaft 25 or with the sun wheel shaft 30, in rotationally fast fashion.

Furthermore, a control unit 40 is outlined. This receives measured operating and travel parameters via signal lines 41 and load or speed data from an drive pedal 42. The control unit 40 forms from the signals control signals for the hydrostat 4, which are transmitted to the latter via the control line 43, and control signals 44 for the clutches K1, K2, K3, K4, KR, KV. Finally, there is further provided a preselector switch 45, which the driver actuates in order to select the other switching strategy via the further motion gear.

Figures 2, 3:
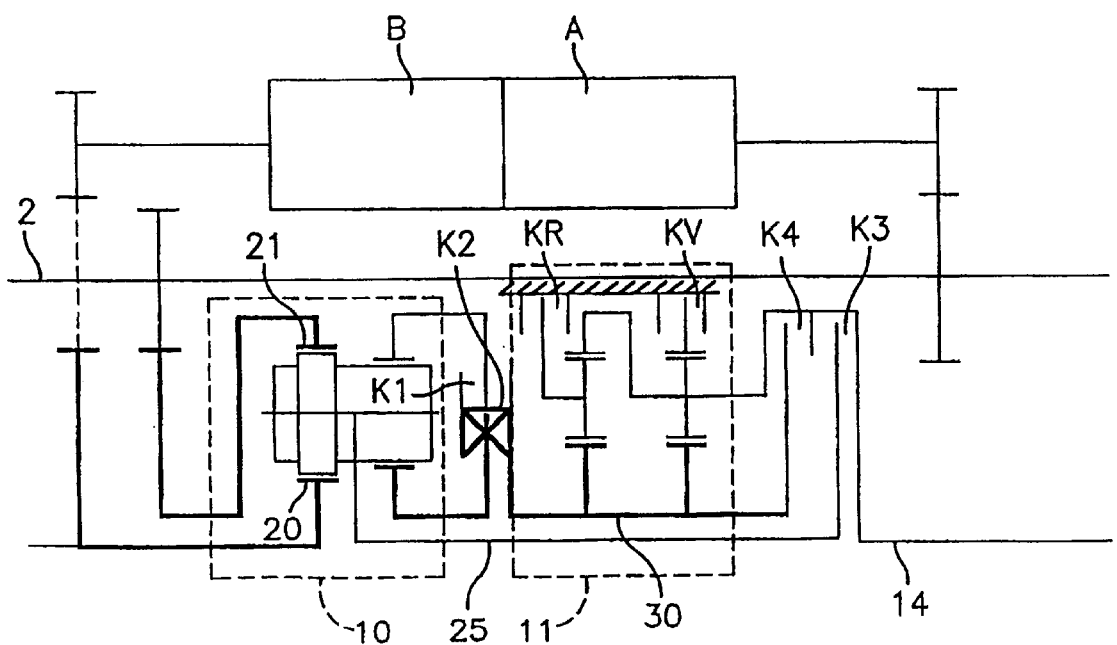
FIG. 2 shows a connection plan.
FIGS. 3 to 5 show the switching positions of the transmission which are run through as the method is performed.

FIG. 2 shows, in a table, which clutches are engaged in the individual motion gears; in this table, the engaged condition is indicated by an X in the respective row and column. In the transmission selected as an example, two reverse motion gears R1, R2 and four forward motion gears V1, V2, V3 and V4 are provided. The six rows correspond to the motion gears. It is possible to discern which clutches are to be disengaged or engaged respectively to switch over from one motion gear to another.

FIG. 6 shows a method of control which in all circumstances ensures the engagement of a motion gear suitable for the instantaneous speed of travel without prior standstill, if an interruption of the power transmission has preceded. According to the method, irrespective of the position of the third clutch KV and of the further clutches K3 or K4, depending upon the instantaneous speed of travel, the first clutch K1 or the second clutch K2 is synchronized and engaged by adjustment of the hydrostat 4 and either one of the further clutches K3 or K4 or the third clutch KV is synchronized and then engaged.

Figure 4:
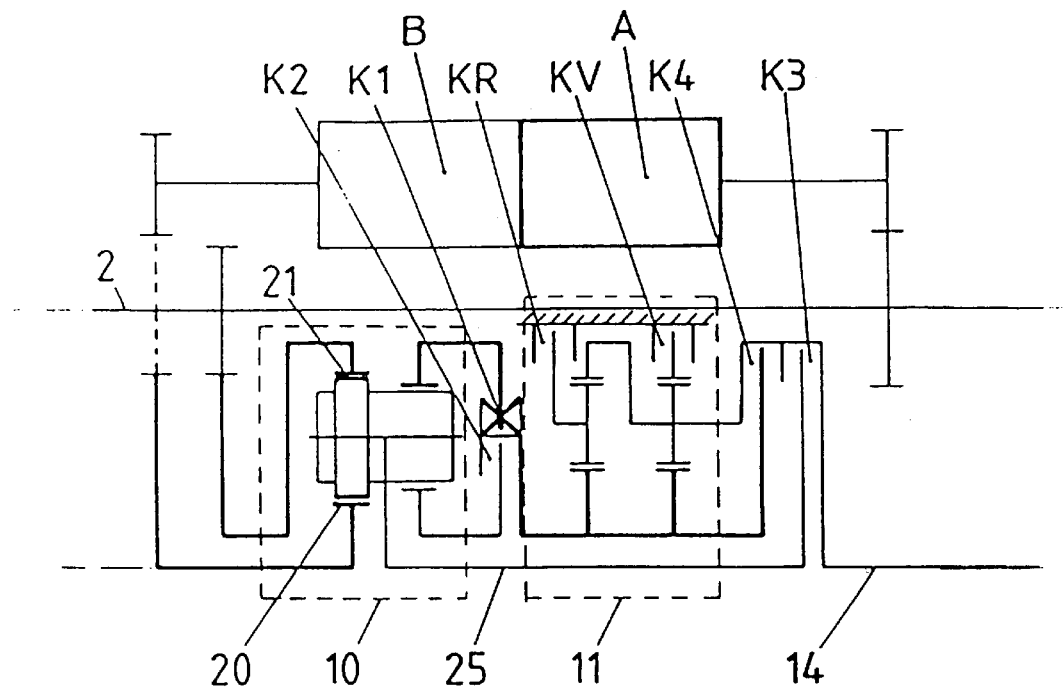

In the text which follows, the inventive mode of procedure after an emergency braking which is being performed not to a complete standstill is described with reference to FIGS. 3 to 5 and shown in FIG. 7.

In the case of an emergency braking from the fourth motion gear, for the time being only the clutch K4 is disengaged; in the case of an emergency braking from the third motion gear, for the time being only the clutch K3 is disengaged; in the case of an emergency braking from the second motion gear, for the time being only the clutch KV is disengaged while K2 remains engaged. Accordingly, the sun wheel shaft 30 continues to be, so to speak, held captive by K2. Its movement is no longer arbitrary, but can be regulated by adjustment of the hydrostat 4. In whichever of the motion gears the emergency braking began, the transmission is in the condition shown in FIG. 3.

As a result of the emergency braking the vehicle has almost, but only just almost, come to a standstill; the vehicle continues to move slowly.

If now, still before the vehicle comes to a standstill, the driver passes to the control unit the instruction to accelerate again, then the first motion gear must be engaged. By adjustment of the hydrostat 4 in the direction towards a greater delivery quantity, i.e. in the direction towards a block rotation of the summating planet transmission 10, synchronous running is created at the clutch K1. Such running is achieved in circumstances in which the speed of rotation of the first output 26 is equal to that of the sun wheel shaft 30. Now, the first clutch K1 is engaged and subsequently the clutch K2 is disengaged. This stage can be seen in FIG. 4.

Figure 5:
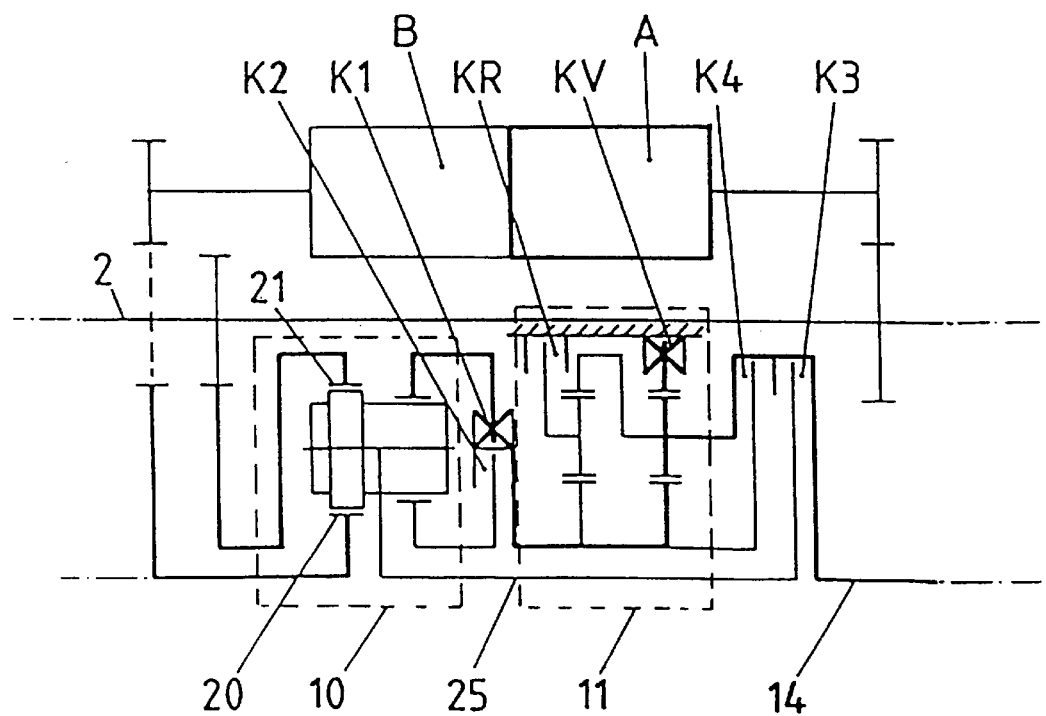

Now, according to FIG. 5, as a result of further adjustment of the hydrostat equality of speed of rotation is created at the clutch KV and the latter is engaged. The power transmission has now been restored, and the vehicle can be accelerated.

In the case of the acceleration of the vehicle by external forces, a similar procedure is implemented as shown in FIG. 8. The difference resides in that, corresponding to the speed progression opposite to an emergency braking, in the first instance the second clutch K2 is synchronized and engaged and then, depending upon the speed which has meanwhile been reached, one of the further clutches K3 or K4 is synchronized and engaged.

In the case of transmissions equipment with a fourth clutch KR for travel in reverse, the method is analogous, that is to say the same, but instead of the third clutch KV, the fourth clutch KR, that is the one for travel in reverse, is actuated in the same way as shown in FIG. 9.

What is claimed is:

1. A method for controlling a power-dividing transmission of a vehicle having an instantaneous speed of travel, said transmission comprises an adjustable hydrostat unit, a summating planet transmission with at least two outputs, and a downstream motion gear transmission designed as a dual planet transmission and having an offtake shaft, and wherein n stages follow one another at synchronous points, at which points clutches are connected, wherein the at least two outputs are connectable to the motion gear transmission via at least one of a first clutch and a second clutch and an element of the motion gear transmission is arrestable by a third clutch, and further clutches for further respective motion gears are provided at the offtake shaft of the motion gear transmission, the method comprising the steps of:

(1) in conditions of travel in which an interruption of power transmission is necessary, irrespective of the position of the third clutch and of the further clutches, depending upon the instantaneous speed of travel, synchronizing and engaging at least one of the first clutch and the second clutch by adjustment of the hydrostat unit and, only then, synchronizing and engaging at least one of the further clutches and the third clutch; and (2) after an emergency braking which is not undertaken to standstill of the vehicle, from one of the further motion gears, switching to a lower gear by the following sequential steps of:

(a) disengaging the further clutches for the respective motion gears;

(b) by adjustment of the hydrostat unit, creating synchronous running at the first clutch and at the second clutch;

(c) engaging the first clutch and disengaging the second clutch, if engaged;

(d) by adjustment of the hydrostat unit, setting equality of a speed of rotation at the third clutch in a manner corresponding to the instantaneous speed of travel; and (e) only after step (d), engaging the third clutch and restoring the power transmission.

2. A method as claimed in claim 1, further comprising the step of, in the case of acceleration of the vehicle by external forces, switching from a low speed into a higher motion gear by the following steps of:

(a) disengaging the third clutch;

(b) by adjustment of the hydrostat, creating synchronous running at the first clutch and at the second clutch;

(c) engaging the second clutch and disengaging the first clutch, if engaged;

(d) as soon as the second clutch has been engaged, creating synchronous running at at least one of the further clutches in a manner corresponding to the instantaneous speed of travel; and (e) then engaging one of the further clutches and restoring the power transmission.

3. A method as claimed in claim 1, wherein the power-dividing transmission has a fourth clutch for travel in reverse, and further comprising the steps of, in conditions of travel in reverse in which a transmission switching position is undefined, irrespective of a position of the fourth clutch and of the further clutches, depending upon the instantaneous speed of travel, synchronizing and engaging at least one of the first clutch and the second clutch by adjustment of the hydrostat, and then synchronizing and engaging at least one of the further clutches and the fourth clutch.

* * * * *